(12) United States Patent
Varakin et al.

(10) Patent No.: US 10,474,679 B2
(45) Date of Patent: Nov. 12, 2019

(54) METHOD FOR EXECUTING QUERIES ON STREAMING DATA USING GRAPHIC PROCESSING UNITS

(71) Applicant: SQREAM TECHNOLOGIES LTD, Ramat Gan (IL)

(72) Inventors: Kostya Varakin, Haifa (IL); Ami Gal, Kfar HaOranim (IL); Ori Netzer, Modiin (IL)

(73) Assignee: SQREAM TECHNOLOGIES LTD, Tel Aviv (IL)

(*) Notice: Subject to any disclaimer, the term of this patent is extended or adjusted under 35 U.S.C. 154(b) by 489 days.

(21) Appl. No.: 14/778,246

(22) PCT Filed: Mar. 18, 2014

(86) PCT No.: PCT/IL2014/050297
§ 371 (c)(1),
(2) Date: Sep. 18, 2015

(87) PCT Pub. No.: WO2014/147617
PCT Pub. Date: Sep. 25, 2014

(65) Prior Publication Data
US 2016/0283556 A1    Sep. 29, 2016

Related U.S. Application Data

(60) Provisional application No. 61/802,856, filed on Mar. 18, 2013.

(51) Int. Cl.
*G06F 16/245* (2019.01)
*G06F 16/22* (2019.01)
(Continued)

(52) U.S. Cl.
CPC .... *G06F 16/24569* (2019.01); *G06F 16/2255* (2019.01); *G06F 16/245* (2019.01);
(Continued)

(58) Field of Classification Search
None
See application file for complete search history.

(56) References Cited

U.S. PATENT DOCUMENTS

| | | | |
|---|---|---|---|
| 2004/0111410 A1* | 6/2004 | Burgoon | G06F 16/2462 |
| 2011/0264626 A1 | 10/2011 | Gautam et al. | |
| 2012/0259843 A1 | 10/2012 | Child | |

FOREIGN PATENT DOCUMENTS

WO    2012025915 A1    3/2012

OTHER PUBLICATIONS

Abelearcher et al., What is GPU binning Jul. 2, 2010, overclock.net, http://www.overclock.net/forum/74-graphics-cards-general/767998-what-gpu-binning.html.*

(Continued)

*Primary Examiner* — Jason G Liao
(74) *Attorney, Agent, or Firm* — Browdy and Neimark, P.L.L.C.

(57) ABSTRACT

The present invention discloses a method for real time execution of SQL queries on data stream using HWA units. The method comprising the step of: receiving data stream and injecting directly in to the one more HWA units, receiving SQL query and identifying SQL query type, statistically real time analyzing multiple data streams and calculating statistics coefficients and characteristics of data stream, creating metadata based on statistical analysis in case the calculated statistics coefficients and characteristics obey predefined rules and using created metadata for SQL execution based on SQL identified SQL type in case the calculated statistics coefficients and characteristics obey predefined rules. The steps of statistical data analysis and creation of meta data are performed by the HWA.

8 Claims, 5 Drawing Sheets

(51) Int. Cl.
   *G06F 16/2453*    (2019.01)
   *G06F 16/2458*    (2019.01)
   *G06F 16/2455*    (2019.01)
(52) U.S. Cl.
   CPC ...... *G06F 16/2453* (2019.01); *G06F 16/2462* (2019.01); *G06F 16/24564* (2019.01)

(56) References Cited

OTHER PUBLICATIONS

Lee et al., AC 2011-1301: Implementing an Affordable High Performance Computing Platform for Teaching-Oriented Computer Science Curriculum Jan. 13 ACM Transactions on Computing Education, vol. 13 Iss 1, 10 pages.*

8.8 Understanding the Query Execution Plan date unknown [captured by archive.org on Dec. 14, 2012], https://web.archive.org/web/20121218024025/https://dev.mysql.com/doc/refman/5.5/en/execution-plan-information.html.*

Hanson, Statistics Used by the Query Optimizer in Microsoft SQL Server 2005 date unknown [captured by archive.org on Feb. 6, 2012], microsoft, https://web.archive.org/web/20090206103056/https://technet.microsoft.com/en-us/library/cc966419.aspx.*

Horner, Cluster size experiment Oct. 26, 2012, wordpress, https://ejrh.wordpress.com/2012/10/26/cluster-size-experiment/.*

Karthik et al., Order by=Bubble Sort? Quick Sort? Insertion Sort? Mar. 7-8, 2013, sqlservercentral, https://www.sqlservercentral.com/forums/topic/order-by-bubble-sort-quick-sort-insertion-sort.*

Sam11 et ak., SQL Server Sorting Algorithm May 4, 2011, stackoverflow, https://stackoverflow.com/questions/5880198/sql-server-sorting-algorithm.*

Levitin, Introduction to The Design & Analysis of Algorithms 07, Addison-Wesley, 2nd, Chapters 3-7.*

* cited by examiner

| SQL Analyzer | | 40 |

| Check SQL format | 402 |

| Identifying the type of the SQL query: filter/range, aggregate, Set, Sorting (e.g. join operation) | 404 |

| Convey type identification to SQL performance unit and decision module | 406 |

Figure 3

METHOD FOR EXECUTING QUERIES ON STREAMING DATA USING GRAPHIC PROCESSING UNITS

BACKGROUND

1. Technical Field

The present invention relates generally Method for Executing SQL Queries on data streams directly on HWA unit.

BRIEF SUMMARY

The present invention provides a method for real time execution of SQL queries on data stream using HWA units. The method comprising the step of: receiving data stream and injecting directly in to the one more HWA units, receiving SQL query and identifying SQL query type, statistically real time analyzing multiple data streams and calculating statistics coefficients and characteristics of data stream, creating metadata based on statistical analysis in case the calculated statistics coefficients and characteristics obey predefined rules and using created metadata for SQL execution based on SQL identified SQL type in case the calculated statistics coefficients and characteristics obey predefined rules.

According to some embodiments of the present invention the steps of statistical data analysis and creation of meta data are performed by the HWA.

According to some embodiments of the present invention the statistically real time analyzing includes at least one of: data distribution pattern in time, data points are independent probabilistically one to another, no correlation or no clustering between data units.

According to some embodiments of the present invention the creation of metadata for the data stream include one of the following: histogram, splitters or bloom filter. According to some embodiments of the present invention the creation of metadata for the data stream include for set operation include creating hashing function to minimize collisions and to perform join with minimal amount of false positives caused by imperfect hash function collisions.

According to some embodiments of the present invention the creation of metadata for the data stream for sort operation, include applying histogram efficient Sorting. According to some embodiments of the present invention the creation of metadata for the data stream for sort operation, include dynamically clustering data groups for sorting, such as data elements between bins is optimized to fit onboard memory size of the HWA unit.

According to some embodiments of the present invention brute force sorting is applied on data stream queries in case data in uniformly distributed.

According to some embodiments of the present invention using the created metadata includes improving execution of the SET or sorting SQL queries in case data in not uniformly distributed.

According to some embodiments of the present invention using the created meta data for SET operation includes creating hash function and storing temporary results of SQL queries incase data size exceeds GPU on board available memory.

According to some embodiments of the present invention using the created meta data for SET includes histogram optimization, in case the data streaming has statistical properties that allow performing efficient Sorting operations.

The present invention provides a system for real time execution of SQL queries on data stream using only HWA units, wherein the data stream is injected directly in to the one more HWA units. The system comprising the step of: SQL analyzer module for receiving SQL query and identifying SQL query type and statistically, analyzing module implemented in the HWA unit for real time analyzing multiple data streams and calculating statistics coefficients and characteristics of data stream and execution module implemented in the HWA unit for creating metadata based on statistical analysis in case the calculated statistics coefficients and characteristics obey predefined rules and using created metadata for SQL execution based on SQL identified SQL type in case the calculated statistics coefficients and characteristics obey predefined rules.

According to some embodiments of the present invention the statistically real time analyzing include calculating major statistics coefficients on the GPU.

According to some embodiments of the present invention the statistically real time analyzing include Identifying in real time statically characteristics of the streamed including at least one of: data distribution pattern in time, data points are independent probabilistically one to another, no correlation or no clustering between data units.

According to some embodiments of the present invention the creation of metadata for the data stream include one of the following: histogram, splitters or bloom filter. According to some embodiments of the present invention the creation of metadata for the data stream include for set operation include creating hashing.

According to some embodiments of the present invention the creation of metadata for the data stream for sort operation, include applying histogram efficient Sorting.

According to some embodiments of the present invention the creation of metadata for the data stream for sort operation, include dynamically clustering data groups for sorting, such as data elements between bins is optimized to fit onboard memory size of the HWA unit.

According to some embodiments of the present invention brute force sorting is applied on data stream queries in case data in uniformly distributed.

According to some embodiments of the present invention using the created metadata includes improving execution of the SET or sorting SQL queries in case data in not uniformly distributed.

According to some embodiments of the present invention using the created meta data for SET operation includes creating hash function and storing temporary results of SQL queries incase data size exceeds GPU on board available memory.

According to some embodiments of the present invention using the created meta data for SET include histogram optimization, in case the data streaming has statistical properties that allow performing efficient Sorting operations.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which:

FIG. 3 is a flow diagram of the SQL analyzer module processing, according to some embodiments of the invention;

DETAILED DESCRIPTION

Figure 1:
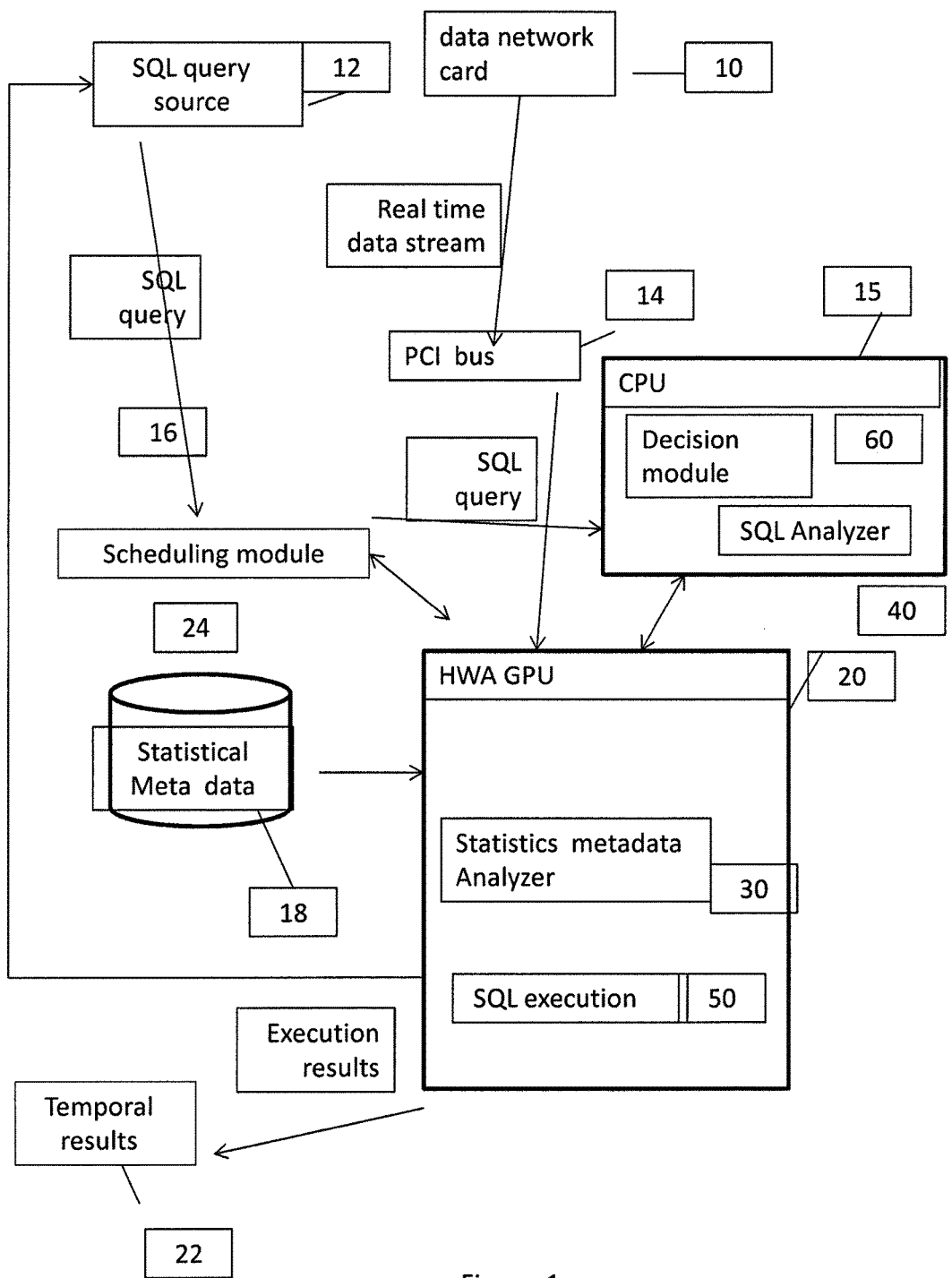
FIG. 1 illustrates a block diagram showing the entities and modules involved in executing queries on data stream, according to some embodiments of the invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The term "HWA (HardWare Accelerator):" as used herein in this application, is defined as any hardware that connected to main Central Processing Unit (CPU) through a Peripheral Component Interconnect (PCI) bus and encompasses a multiple computational cores inside. Example: GPGPUs (with 1000s of cores), Intel MICs (with 10s of cores). GPU or MIC or accelerator in this text are used interchangeably.

In the context of present invention the GPU is being directly fed by data streamed from other device attached to PCI bus of the same host. This configuration could be used on single computer or multiple computers.

The term "SQL query" includes any database based query in any language on data that is streamed from storage or any other source.

The present invention provides a cluster based architecture where HWA units are switching data between cluster instances, bypassing the host CPU. In this cluster configuration HWA units are continuously operating on data streams which are originated from the network. This unique configuration suggested by the present invention, has advantage over known clustering configuration which comprise: CPU and HWA unit, the scheduling in such configuration support the processing of data by HWA units which comes from host CPU memory and not directly from network from other PCI device. In this known configuration the processed data stream is first received at the host machine memory, which have large memory size and buffering capability by using external storage. To enable efficient stream processing in the configuration as suggested by the present invention where the HWA units are fed directly and directly return the processed results to network using minimum buffering memory, it is required to optimize the data processing as will be further bellow.

FIG. 1 illustrates a block diagram showing the entities and modules involved in executing queries on data stream in real time, according to some embodiments of the invention. The SQL query may be received from a user or any other entity (12) to be executed on a HWA unit (20), to be operated on real time data received directly from a data network card (10). The received data is injected directly into the one or more HWA units, by the BCI buss 14 for analyzing the data stream statistics by the analyzer 30 at the HWA unit (20) and creating metadata based on said data analysis. The created metadata is stored in statistical metadata database (18). The SQL queries are assigned by the Scheduling module 16 and are analyzed by SQL analyzer at the CPU 15 (optionally at the HWA unit). The SQL execution module 50 perform the SQL query on the HWA based on SQL analyzing results and created metadata, according predefined rules applied by the decision module 60 running on the CPU 15 (or optionally on the HWA unit). Optionally some of the execution results are saved in temporal storage medium 20 in case the HWA memory is overloaded.

Figure 2:
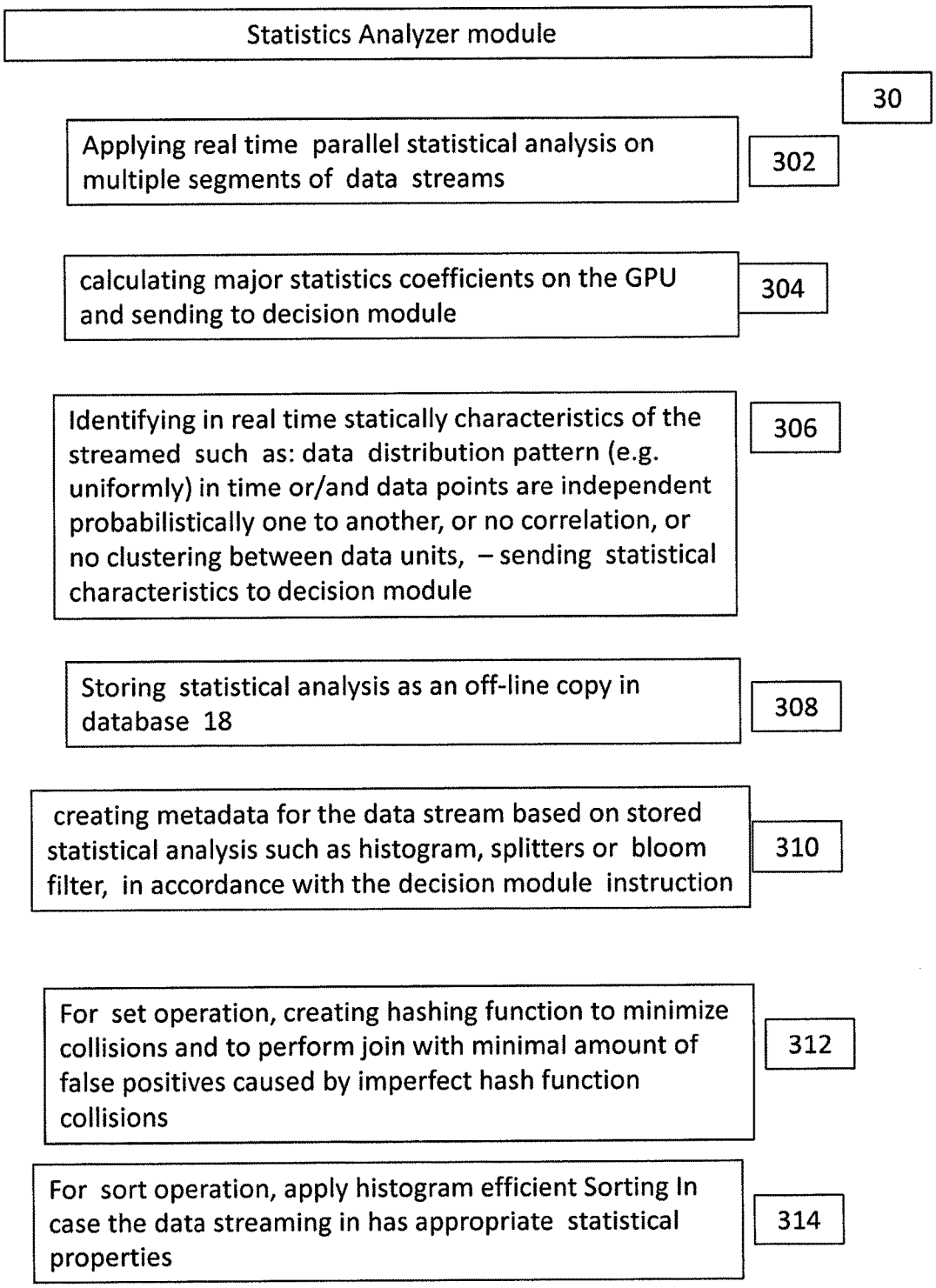
FIG. 2 is a flow diagram Statistics Analyzer module processing, according to some embodiments of the invention.

FIG. 2 is a flow diagram Statistics Analyzer module processing, according to some embodiments of the invention. At the first step, the analyzer module performs real time parallel statistical analysis on multiple segments of data streams (step 302), based on the statistical analysis are calculated major statistics coefficients (step 304) on the HWA and statistical characteristics of the streamed are identified (step 306). The statistical characteristics include at least one of: data distribution pattern in time, (e.g. uniformly), probabilistic dependency between data points, correlation or clustering/non clustering between data units of the data stream. The calculated statistics coefficients and identified statistical characteristics are conveyed to the decision module 50 at the CPU (optionally on the HWA unit). At the next step the statistical analysis is stored as an off-line copy and the database 20 (308.

Based on stored statistical analysis is created metadata for the data stream, such metadata may include: a histogram, splitters or bloom filter. The relevant metadata is created in accordance with the decision module 50 instruction based on predefined rules (step 310).

Optionally, for set operation, a hashing function is created for minimizing collisions and to performing join operations with minimal amount of false positives which may be caused by imperfect hash function collisions when performed at the CPU (step 312).

Optionally for sort operation is activated histogram function, in case the data streaming in, has appropriate statistical properties such as: well defined clustering or good correlation results. (step 314).

According to some embodiments of the present invention it is suggested to dynamically and continuously, control the group clustering in run time by determining the number of data elements between bins. This clustering optimize the groups size while maintaining the total number of sorting elements in each group during sorting operation to fit a single HWA memory size. Optionally, sorting operation is not bounded to use a single HWA and can processed by several HWA units simultaneously. This optimization over the group clustering, which support the adjusting bins, such as the data size between bins fits the HWA unit, is a unique feature of the present invention for the supporting ifs the clustering configuration of the HWA units which enable directing feeding from the network using minimum buffering. When sorting the streamed data on HWA unit, the unit memory may overflow frequently. For avoiding memory overflow, it is suggested according to some embodiments of the present invention, to dynamically adjust the number of bins by using V-optimal histogram algorithm or any other known in prior art to set the number of data elements between bins. This approach allows, controlling the data size residing in HWA memory and enables external sorting for streams.

FIG. 3 is a flow diagram of the SQL analyzer module processing, according to some embodiments of the invention. At the first step, the SQL query format is checked (step 402), for identifying the type of the SQL query (step 404). The type of the SQL query may be at least one of: filter/range, aggregate, Set operations such as join, Sorting etc. The type of the SQL query is conveyed to the execution module 50 and/or decision module 40 (step 406).

When, HWAs units are operating in cluster mode and connected directly to network adapters, it is suggested that each query will be presented in tree structure, where each node represent an operation of the SQL query, hence, while processing, the data streams will flow between tree nodes.

Figure 4:
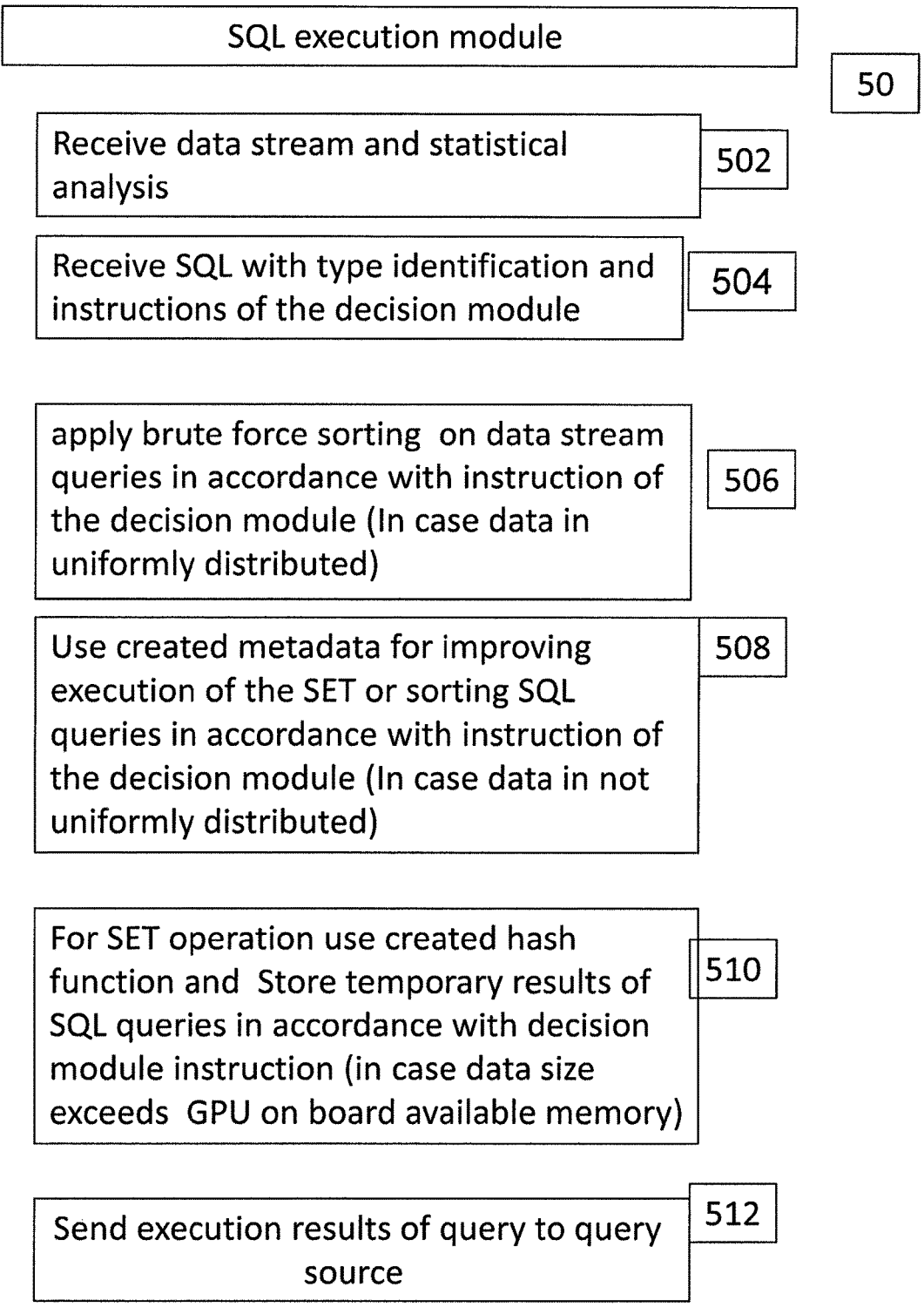
FIG. 4 is a flow diagram of the SQL execution module processing, according to some embodiments of the invention.

FIG. 4 is a flow diagram of the SQL execution module processing, according to some embodiments of the invention. At the first steps are received the following information: data stream, if's statistical analysis results (step 502), the SQL query, including the type identification and the decision module instructions (step 504). In case the data is uniformly distributed, brute force sorting operation is applied on data stream queries in accordance with instruction of the decision module (step 506). In case data is not uniformly distributed, the statistical metadata that was created at the beginning of the data stream is utilized repeatedly throughout the query execution process for improving the execution of the SET or sorting SQL operations in accordance with instruction of the decision module (step 508). The statistical metadata may be calculated periodically according to data mining algorithms, Hash function may be created accordingly for SET operation. In case data size exceeds HWA on board available memory temporary results of SQL queries are stored in cache memory 22, in accordance with decision module instruction (step 510).

Figure 5:
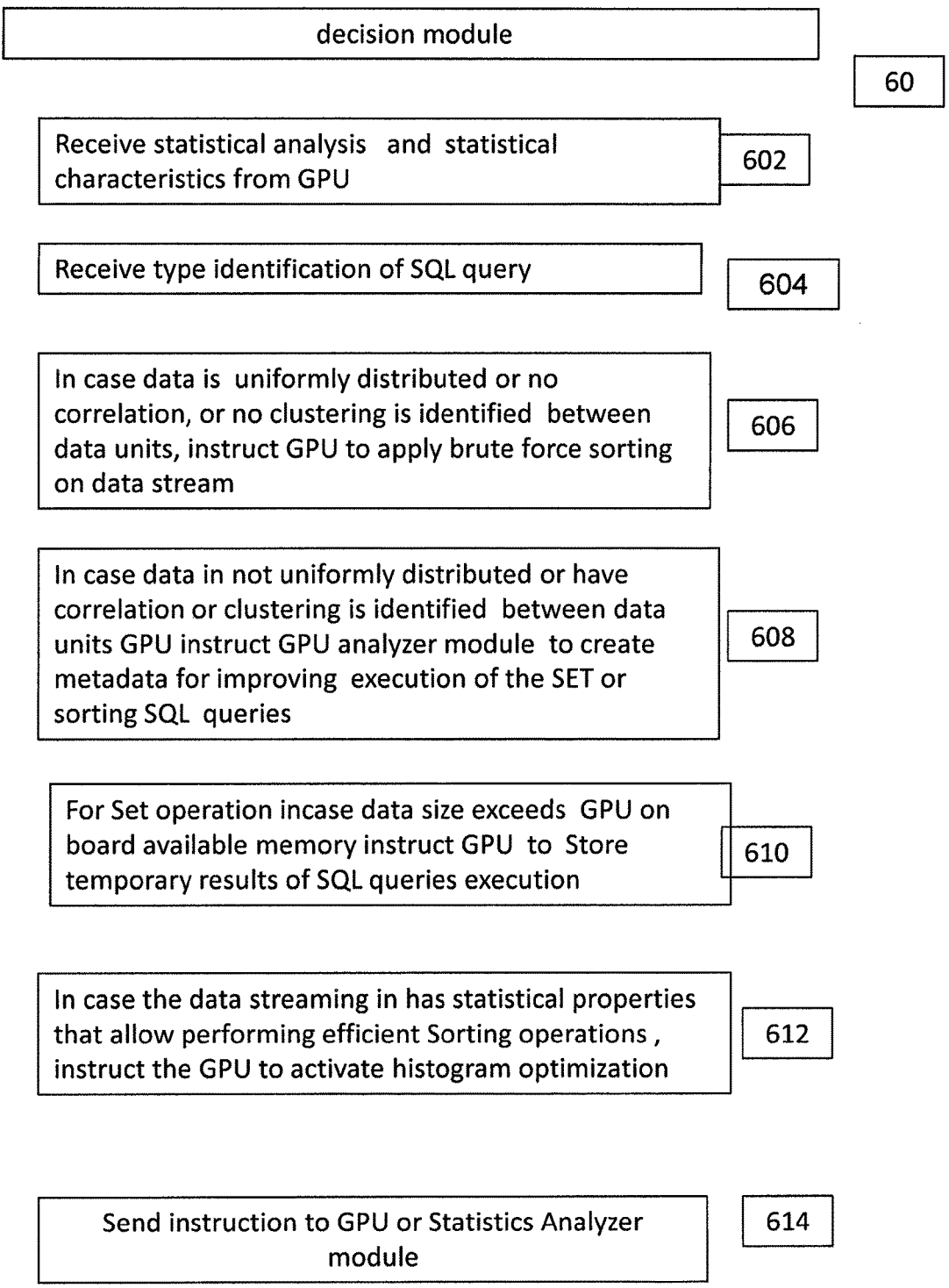
FIG. 5 is a flow diagram of the decision module processing according to some embodiments of the invention.

FIG. 5 is a flow diagram of the decision module processing according to some embodiments of the invention. At the first steps are received the statistical analysis calculation and statistical characteristics from the HWA (step 602), and identification of SQL query (step 604). Based on received data, the decision module applies predefined rules to determine operation of metadata creation and execution operation. For example, in case the data stream is uniformly distributed or no correlation, or no clustering is identified between data stream units, the decision module instruct the HWA to apply brute force sorting operation on data stream (step 606). In case data is not uniformly distributed or no correlation or clustering is found between the data stream units HWA, the decision module instructs the HWA analyzer module to create metadata for improving execution of the SET or sorting SQL operations (step 608). Incase data size exceeds HWA on board available memory during Set operation such as join, the decision modules instructs the HWA to Store temporary results of SQL queries execution in the database 22 (step 610).

In case the data streaming in has statistical properties that allow performing efficient Sorting operations, instruct the HWA to activate histogram optimization (step 612). For example the following sequence: 1 9 4 5 3 1 0 8 6: there is no pattern for efficient Sorting, but the following sequence 1 1 1 1 5 5 5 9 9 9, we a pattern can be detected: group of 1's, 5's and 9's and define the clusters by using k-means clustering algorithm on GPU and for sorting can be applied only on the clusters instead of applying it on the whole stream and return the requested sorting result.

Each instruction is sent in real time to the execution module 50 or the analyzer module 30 (step 614).

In the above description, an embodiment is an example or implementation of the invention. The various appearances of "one embodiment", "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

The invention claimed is:

1. A method for real time execution of SQL queries on at least one data stream using HWA units, said method comprising the step of:

receiving at least one data stream and injecting said data stream into the one more HWA units;

receiving an SQL query and identifying said SQL query type;

real time statistical analyzing at least one data stream, said statistical analysis including: calculating statistics coefficients and characteristics of the at least one data stream;

operating at least one processor programmed, in case the calculated statistics coefficients and characteristics obey predefined rules, to create metadata based on statistical analysis; and, in case the calculated statistics coefficients and characteristics obey the predefined rules, to execute the SQL queries using said created metadata, such that the execution is based on SQL query identified type;

wherein the steps of statistical data analysis and creation of meta data are performed by the HWA;

wherein the real time statistical analysis includes at least one of: data distribution pattern in time, data points are independent probabilistically one to another, no correlation or no clustering between data units;

wherein the creation of metadata for the data stream for sort operation, includes, in case data is distributed with a predetermined degree of uniformity as determined from a data distribution pattern in time, applying brute force sorting operation on the data stream; and further comprising executing the SQL queries using said created metadata, such that the execution is based on SQL query identified type.

2. The method of claim 1 wherein the at least one processor is programmed, in case data is not distributed with a predetermined degree of uniformity as determined from a data distribution pattern in time, to use the statistical metadata that was created at the beginning of the data stream repeatedly throughout the query execution process for executing of the SET or sorting SQL operations.

3. A system for real time execution of SQL queries on at least one data stream using only HWA units, wherein the at least one data stream is injected into the one more HWA units, said system comprised of:

a CPU unit comprised of an SQL analyzer module and decision module, wherein the SQL analyzer is programmed to receive an SQL query and identify said SQL query type;

an HWA unit comprised of:

a statistics analyzer module programmed for real time analyzing multiple data streams and calculating statistics coefficients and characteristics of at least one data stream, and, in case the calculated statistics coefficients and characteristics obey predefined rules, creating metadata based on statistical analysis; and an execution module programmed for using the created metadata for SQL execution based on SQL query identified type in case the calculated statistics coefficients and characteristics obey the predefined rules;

wherein the real time statistical analysis includes at least one of: data distribution pattern in time, data points are independent probabilistically one to another, no correlation or no clustering between data units;

wherein the statistical analysis based on which the metadata is created comprises a bloom filter;

wherein the creation of metadata for the data stream for sort operation, includes, in case data is distributed with a predetermined degree of uniformity as determined from a data distribution pattern in time, applying brute force sorting operation on the data stream; and wherein the execution module is programmed to execute the SQL queries using said created metadata, such that the execution is based on SQL query identified type.

4. The system of claim 3 wherein the execution module for creating metadata for the data stream for set operation creates hashing.

5. The system of claim 3 wherein the execution module for creating metadata for the data stream for sort operation dynamically clusters data groups for sorting, including optimizing data elements within the group to fit onboard memory size of the HWA unit.

6. The system of claim 3 wherein the execution module for using the created meta data for a SET operation includes creating a hash function and storing temporary results of SQL queries in case data size exceeds GPU on board available memory.

7. A method for real time execution of SQL queries on at least one data stream using HWA units, said method comprising the step of:

receiving at least one data stream and injecting said data stream into the one more HWA units;

receiving an SQL query and identifying said SQL query type;

real time statistical analyzing at least one data stream, said statistical analysis including: calculating statistics coefficients and characteristics of the at least one data stream;

operating at least one processor programmed, in case the calculated statistics coefficients and characteristics obey predefined rules, to create metadata based on statistical analysis; and, in case the calculated statistics coefficients and characteristics obey the predefined rules, to execute the SQL queries using said created metadata, such that the execution is based on SQL query identified type;

wherein the steps of statistical data analysis and creation of meta data are performed by the HWA;

wherein the real time statistical analysis includes at least one of: data distribution pattern in time, data points are independent probabilistically one to another, no correlation or no clustering between data units;

wherein the creation of metadata for the data stream for sort operation, includes dynamically clustering data groups for sorting, including data elements within each cluster being optimized to fit onboard memory size of the HWA unit; and further comprising executing the SQL queries using said created metadata, such that the execution is based on SQL query identified type.

8. A System for real time execution of SQL queries on at least one data stream using only HWA units, wherein the at least one data stream is injected into the one more HWA units, said system comprised of:

a CPU unit comprised of an SQL analyzer module and decision module, wherein the SQL analyzer is programmed to receive an SQL query and identify said SQL query type;

an HWA unit comprised of:

a statistics analyzer module programmed for real time analyzing multiple data streams and calculating statistics coefficients and characteristics of at least one data stream, and, in case the calculated statistics coefficients and characteristics obey predefined rules, creating metadata based on statistical analysis;

an execution module programmed for using created metadata for SQL execution based on SQL query identified type in case the calculated statistics coefficients and characteristics obey the predefined rules;

wherein the real time statistical analysis includes at least one of: data distribution pattern in time, data points are independent probabilistically one to another, no correlation or no clustering between data units;

wherein the statistical analysis based on which the metadata is created comprises a bloom filter;

wherein the creation of metadata for the data stream for sort operation, includes dynamically clustering data groups for sorting, including data elements within each cluster being optimized to fit onboard memory size of the HWA unit; and wherein the execution module is programmed to execute the SQL queries using said created metadata, such that the execution is based on SQL query identified type.

* * * * *